Sept. 16, 1969  MASAHIRO FUJIMOTO ET AL  3,467,218
DEVICE FOR DIFFUSING SOUNDS

Filed Dec. 6, 1967  2 Sheets-Sheet 1

INVENTORS
MASAHIRO FUJIMOTO,
TOSHIAKI YAMAMOTO,

BY Stevens, Davis, Miller & Mosher

ATTORNEYS

INVENTORS
MASAHIRO FUJIMOTO,
TOSHIAKI YAMAMOTO,

BY Stevens, Davis, Miller & Mosher

ATTORNEYS

United States Patent Office 3,467,218
Patented Sept. 16, 1969

3,467,218
DEVICE FOR DIFFUSING SOUNDS
Masahiro Fujimoto and Toshiaki Yamamoto, Tokyo, Japan, assignors to Victor Company of Japan, Limited, Yokohama, Japan
Filed Dec. 6, 1967, Ser. No. 688,568
Claims priority, application Japan, Dec. 9, 1966, 66/80,381
Int. Cl. H04r 7/16
U.S. Cl. 181—31                    5 Claims

ABSTRACT OF THE DISCLOSURE

A device for diffusing sounds comprising a plurality of diffusion plates arranged parallel to and spaced apart from one another in layers horizontally in the direction of incidence of sounds from a speaker. Each of the diffusion plates is formed in such a manner that the surface of the plate is linear in section in its center portion but curved in wave form in section in its opposite end portions, the height of the wave becoming increasingly larger in going toward the ends. The device has the effect of diffusing sounds from the speaker without the power level of the sounds being reduced especially in the center of the speaker.

This invention relates to devices for diffusing sounds, and in particular to a device for diffusing sounds of plane wave form from speakers or the like by converting them into sounds in the form of spherical waves.

In one device for diffusing sounds known to the art of transmitting sounds in which sound waves of plane wave form are diffused in the form of spherical waves so as to make them nondirectional, a plurality of rectangular sound diffusion plates each having an inverted V-shaped cutout in the center are arranged, as subsequently to be described, one above another in parallel relation and spaced apart from one another in such a manner that they are disposed obliquely with respect to the direction of incidence of sound waves from a sound source. The sound diffusion device of the prior art described above operates in such a manner that said inverted V-shaped portions of the sound diffusion plates create differences in the length of paths of travel of sounds between sounds moving along the inclined surfaces of the plates having said cutout and sounds moving along the inclined surfaces of the plates having no cutout, whereby diffusion of sounds can be achieved. Such device is not without a fault. Since sound waves are incident on the plates obliquely even in the center portion, the sounds are subjected to a reduction of power level due to reflection. This phenomenon is markedly observed when the sounds have a shorter wavelength. The present invention obviates the aforementioned defect of prior art device.

The principal object of the present invention is to provide a device for diffusing sounds which is adapted to diffuse sound waves nondirectionally in a satisfactory manner.

Another object of the invention is to provide a device for diffusing sounds which is adapted to convert sound waves of plane wave form into sound waves of spherical wave form in a satisfactory manner with minimized attendant damping of sounds.

Another object of the invention is to provide a device for diffusing sounds which is adapted to diffuse sounds with minimized damping of sounds in the center of the paths of travel of sounds.

Still another object of the invention is to provide a device for diffusing sounds in which rectangular sound diffusion plates each formed to provide a surface curved in wave form in section are employed for diffusing sounds in a satisfactory manner.

Figure 1:
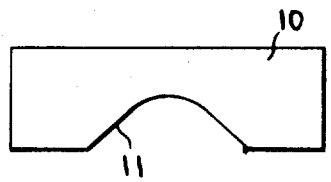
Figure 2:
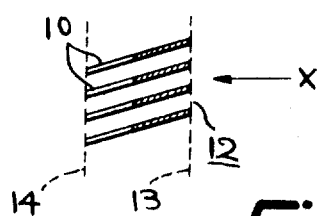
Figure 3:
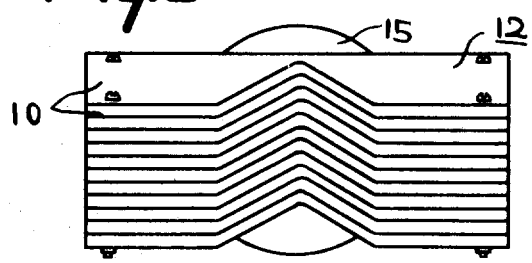
Figure 4:
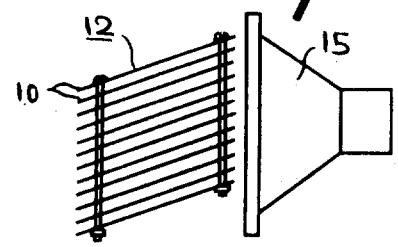
Figure 5:
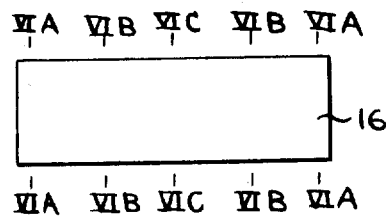
Figure 6:
Figure 6:
Figure 6:
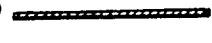
Figure 7:
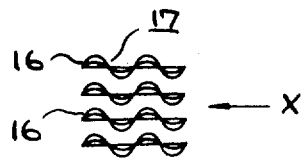
Figure 8:
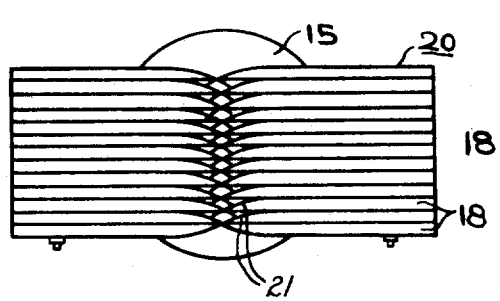
Figure 9:
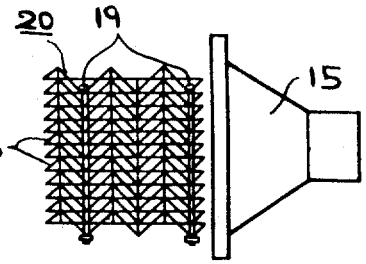
Figure 10A:
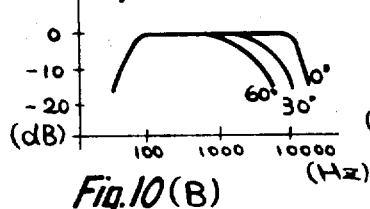
Figure 10C:
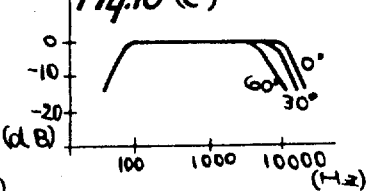
Figure 10B:
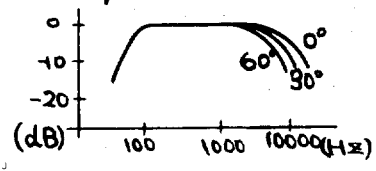

Other objects and features of the present invention will become apparent from consideration of the following description when taken in conjunction with the accompanying drawings, in which:

FIG. 1 is a plan view showing a sound diffusion plate of the prior art;
FIG. 2 is a sectional side view in explanation of arrangement of the sound diffusion plates of the prior art;
FIGS. 3 and 4 are a front view and a side view respectively of sound diffusion plates of the prior art mounted on a speaker;
FIG. 5 is a plan view of one embodiment of the sound diffusion plate according to this invention;
FIGS. 6A, 6B and 6C are longitudinal sectional side views taken along the line VIA—VIA, VIB—VIB and VIC—VIC of FIG. 5;
FIG. 7 is a longitudinal sectional side view in explanation of the arrangement of sound diffusion plates of one embodiment of this invention;
FIGS. 8 and 9 are a front view and a side view respectively of sound diffusion plates of another embodiment of this invention as mounted on a speaker; and
FIGS. 10A, 10B and 10C show frequency response characteristics of output sound waves.

A sound diffusion device of the prior art will first be explained with reference to FIG. 1 to FIG. 4. A sound diffusion plate 10 is formed to provide a substantially inverted V-shaped cutout 11 in the center of one side thereof. A sound diffusion device 12 comprises a plurality of sound diffusion plates 10 arranged parallel to and spaced apart from one another in layers, said layers of sound diffusion plates being disposed obliquely with respect to the direction of incidence of sounds indicated by arrow as seen from the side. The sounds incident on the sound diffusion plates 10 of the sound diffusion device 12 at its entrance end 13 move along the inclined surfaces of the plates toward the exit end 14 of the device. Since the sound diffusion plates 10 are each formed with an inverted V-shaped cutout 11 in the center, the movement of sounds travelling along opposite end portions of the plates having no cutout are delayed as compared with the movement of sounds travelling along the center portion of the plates formed with a cutout because there are differences in the length of paths of movement of sounds. The sounds are thus emanated through the exit end 14 of the device 12 in the form of spherical waves. In practical application, the sound diffusion device 12 is mounted on a speaker 15 as shown in FIG. 3 and FIG. 4. Since the sound waves are incident obliquely on the sound diffusion plates of the device even in the center as described previously, the power level of sounds is reduced due to reflection by the plates. This phenomenon is markedly observed when sounds have a shorter wavelength and higher frequency.

The present invention obviates this defect of the prior art device. Embodiments of the invention will be explained with reference to FIG. 5 to FIG. 10.

FIG. 5 is a plan view of one embodiment of a sound diffusion plate 16 according to this invention. The sound diffusion plate 16 is constructed such that its surface is linear in section in its center portion but curved in wave form in its opposite end portions, the waves becoming increasingly larger in going toward the end edges. In FIGS. 6A, 6B and 6C are shown configurations in longitudinal section of portions of the diffusion plate 16 along the lines VIA—VIA, VIB—VIB and VIC—VIC of FIG. 5. From FIGS. 6A, 6B and 6C, it will be understood that the surface of diffusion plate 16 is linear in section in its center portion as shown in FIG. 6C, and that the waves in the form of a sine wave become increasingly larger in going from the center portion to the opposite end edges of the diffusion plate as shown in FIGS. 6B and 6A. When used with a speaker of 18 centimeters in diameter, this embodiment of the invention has been found to achieve best results when the diffusion plate 16 is a rectangular plate 4 centimeters wide and 20 centimeters long and configured to have 2 to 4 waves with a wave height at opposite end edges (a difference in the height of waves) of 20 millimeters.

In FIG. 7, 17 generally indicates a plurality of sound diffusion plates 16 according to this invention arranged parallel to one another in layers. In this embodiment, the diffusion plates 20 in number are arranged spaced apart from one another an equal distance ranging from 8 to 10 millimeters and disposed horizontally with respect to the direction of incidence of sounds indicated by arrow as seen from the side. By this arrangement, waves moving along the portions of the diffusion plates 16 including the center portion where the waves have a smaller height or the surface is linear are emanated more quickly than sounds moving along the opposite end portions of the diffusion plates 16 where the waves have a larger height, whereby the sound waves of plane wave form incident upon the sound diffusion plates 16 of the device 17 can be scattered in spherical wave form and hence made nondirectional. Since the diffusion plates 16 according to this invention provide a horizontally extending linear path in their center portion for the sound to move there along, the reflection phenomenon caused by diffusion plates which has hitherto been experienced with sound diffusion devices of the above mentioned prior art does not occur when the diffusion device of this invention is used. Sounds can thus be diffused with substantially no reduction in the power level of sounds in and near the center portion of the plates 6.

FIG. 8 and and FIG. 9 are a front view and a side view respectively of another embodiment of the sound diffusion device according to this invention as mounted on a speaker. In this embodiment, a sound diffusion plate 18 is a rectangular plate configured such that its surface is linear in section in its center portion but bent in triangular wave form in opposite end portions. The height of the triangular wave is increased from the center portion toward the opposite end portions. The bent portions form the curve shown by 21 in FIG. 8. As the length of the sound diffusion plate is far longer than the diameter of the speaker 15, the height of the triangular wave near the opposite end portions is kept constant. In order to show the drawing understandably and simply, the triangular wave of the opposite end edge and the linear surface of the center portion are shown in FIG. 9. A sound diffusion device 20 comprises about 20 pieces of such diffusion plates 18 arranged parallel to one another in layers as a unit and supported by support members 19 in spaced apart relation. Such device 20 is horizontally mounted in front of the speaker 15.

In order to explain the specific effect of the sound diffusion device according to this invention, output sound pressure frequency response characteristics are shown in FIG. 10. In the charts of FIGS. 10A, 10B and 10C, sound pressure response (db) in the ordinates are plotted against frequencies (Hz.) in the abscissae.

FIG. 10A shows frequency response characteristics of a broad-band speaker of 20 centimeters in diameter with no sound diffusion device mounted thereon. Angles indicated on the curves in the charts denote angular displacements from the center line of the speaker of the lines on which output sound pressure responses are measured. It will be seen that an output sound pressure response measured on a line angularly displaced from the center line of the speaker by 60 degrees shows a marked reduction in power level especially at higher frequencies at which sounds are highly directional. In FIG. 10B are shown frequency response characteristics of output sound pressure obtained when the sound diffusion device of the prior art shown in FIG. 3 and FIG. 4 is used with the speaker. The device comprises a plurality of sound diffusion plates 7 centimeters in width and arranged such that they are parallel to one another in layers spaced apart from one another a distance of 10 millimeters and inclined at an angle of 45 degrees. It will be understood from the figure that sound waves are diffused over a substantially wide range at an angle of 30 to 60 degrees relative to the center line of the speaker, but that sounds in relatively high frequency levels show a reduction in power level at zero degree or on the center line of the speaker. Frequency response characteristics of output sound pressure obtained when the sound diffusion device according to this invention is used with the speaker are illustrated in FIG. 10C. In this example, the sound diffusion device comprises 20 sound diffusion plates each 7 centimeters in width and configured to provide a surface with waves 15 millimeters in height and formed with an angle of 90 degrees, such diffusion plates being arranged parallel to one another in layers spaced apart from one another a distance of 10 millimeters. From the figure, it will be appreciated that sound waves are diffused in a satisfactory manner over a wide range, and that sound waves, particularly those in high frequency ranges, do not show a reduction in power level in the vicinity of the center line of the speaker.

While the invention has been described with reference to preferred embodiments, it is to be understood that the invention is not limited to the particular forms of diffusion plates described, but that many changes and modifications can be made therein without departing from the spirit and scope of the invention.

We claim:
1. A device for diffusing sounds comprising a plurality of identical sound diffusion plates, each of said sound diffusion plates being configured to provide a linear surface in the center portion and a waved surface in portions other than said center portion, said plurality of sound diffusion plates being arranged in layers parallel to and spaced apart from one another by a predetermined distance, said linear surface being disposed horizontally and in parallel with the direction of incidence of sound waves from a sound source.

2. A device for diffusing sounds as claimed in claim 1 wherein each of said sound diffusion plates is configured such that waves formed on its surface have an increasingly larger height in going from the center of the plate toward its opposite end portions.

3. A device for diffusing sounds as claimed in claim 1 wherein each of said sound diffusion plates is configured such that waves formed on its surface in portions other than the center portion are in sine wave form.

4. A device for diffusing sounds as claimed in claim 1 wherein each of said sound diffusion plates is configured such that waves formed on its surface in portions other than the center portion are in triangular form.

5. A device for diffusing sounds comprising a plurality of identical sound diffusion plates, each of said sound diffusion plates being configured to provide a linear surface in the center portion and a waved surface in section in portions other than said center portion, said curved surface having a wave height becoming increasingly larger in going from near the center portion toward the opposite end portions, a plurality of such sound diffusion plates being arranged in layers parallel to and spaced apart from one another by a predetermined distance and disposed in front of a speaker, said linear surface being disposed horizontally and in parallel with the direction of incidence of sound waves from said speaker.

References Cited

UNITED STATES PATENTS 2,848,058  8/1958  Hartsfield _____ 181—1.5
3,303,904  2/1967  Kelly _____ 181—31

STEPHEN J. TOMSKY, Primary Examiner

U.S. Cl. X.R.

181—.5